United States Patent
Hansen et al.

(10) Patent No.: US 9,325,688 B1
(45) Date of Patent: Apr. 26, 2016

(54) METHODS, SYSTEMS, AND COMPUTER READABLE MEDIUMS FOR PERFORMING WORKFLOW CREDENTIAL MANAGEMENT IN A CONVERGED INFRASTRUCTURE SYSTEM

(71) Applicant: VCE Company, LLC, Richardson, TX (US)

(72) Inventors: Nicholas A Hansen, Willow Spring, NC (US); Jonathan P Streete, San Jose, CA (US); Todd J Dolinsky, Chapel Hill, NC (US); Joshua Lee Bonczkowski, Apex, NC (US)

(73) Assignee: VCE COMPANY, LLC, Richardson, TX (US)

( * ) Notice: Subject to any disclaimer, the term of this patent is extended or adjusted under 35 U.S.C. 154(b) by 0 days.

(21) Appl. No.: 14/145,240

(22) Filed: Dec. 31, 2013

(51) Int. Cl.
*H04L 29/06* (2006.01)

(52) U.S. Cl.
CPC .................... *H04L 63/08* (2013.01)

(58) Field of Classification Search
CPC ......... H04L 63/08; H04L 63/10; H04L 41/08; H04L 41/28; G06F 21/604; G06Q 10/103; H04W 12/08
USPC ............................................ 726/6
See application file for complete search history.

(56) References Cited

U.S. PATENT DOCUMENTS

| 2005/0071420 A1* | 3/2005 | Trossman et al. ........... 709/201 |
| 2013/0198346 A1* | 8/2013 | Jubran et al. ............... 709/220 |

* cited by examiner

*Primary Examiner* — Yogesh Paliwal (74) *Attorney, Agent, or Firm* — Jenkins, Wilson, Taylor & Hunt, P.A.

(57) ABSTRACT

Methods, systems, and computer readable mediums for performing workflow credential information management in a converged infrastructure system (CIS) are disclosed. According to one example, the method includes, at a credential management interface module (CMIM) associated with a CIS, identifying one or more converged infrastructure elements (CIEs) included in the CIS that are associated with a workflow, obtaining credential information sets for each of the one or more CIEs associated with the workflow, and executing the workflow using the obtained credential information sets.

20 Claims, 6 Drawing Sheets

METHODS, SYSTEMS, AND COMPUTER READABLE MEDIUMS FOR PERFORMING WORKFLOW CREDENTIAL MANAGEMENT IN A CONVERGED INFRASTRUCTURE SYSTEM

TECHNICAL FIELD

The subject matter described herein relates to managing credential information. More specifically, the subject matter relates to methods, systems, and computer readable mediums performing workflow credential management in a converged infrastructure system (CIS).

BACKGROUND

A converged infrastructure system (CIS) is a single, optimized computing solution that comprises a plurality of component devices, such as blade or rack-mounted compute devices (i.e. servers), data storage devices, networking equipment and software. Notably, each of these CIS components may be supplied by a different vendor and may have different and sometimes proprietary methods of administrative access (e.g., each component device is preconfigured with unique administrative access methods and credentials). A specific problem faced by many CIS administrators is that during typical workflow operations, maintenance windows or administrative sessions, the many components of the CIS need to be configured securely, with authentication and authorization systems providing access to the component and/or a subset of its functionality. For example, one or more credential information sets may be needed to gain access to the systems and components required for a successful workflow execution. Determining which credentials are needed and ensuring that the requisite credentials are available to the workflow execution is a central problem that requires administrators to have a well-defined and highly secured system in place for managing those credentials. In some instances, a system administrator assigned to manage device access credential information (i.e., passwords, cryptographic keys, certificates, and other means of access) may do so by using a software spreadsheet or handwritten data sheet. One potential problem associated with such a manner of recordkeeping is that credential information can become well known, inaccurate and less secure over a period of time. Presently, software exists for credential information storage purposes, but such software applications are not configured to perform centralized workflow credential management. Namely, providing credential information for the required access to a user associated with the workflow may require the administrator to access each CIS component device involved in the workflow to view or change the access rights individually. Such manual efforts are extremely time consuming, potentially insecure and inconvenient to system administrators.

SUMMARY

Methods, systems, and computer readable mediums for performing workflow credential management in a converged infrastructure system are disclosed. According to one embodiment, the method includes, at a credential management interface module (CMIM) associated with a CIS, identifying one or more converged infrastructure elements (CIEs) included in the CIS that are associated with a workflow, obtaining credential information sets for each of the one or more CIEs associated with the workflow, and executing the workflow using the obtained credential information sets.

According to one system, the system comprises at least one processor, memory, and a CMIM. The CMIM is configured to identify one or more CIEs associated with a workflow, obtain credential information sets for the one or more CIEs associated with the workflow, and execute the workflow using the obtained credential information sets.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable mediums for performing workflow credential management in a converged infrastructure system. As used herein, a CIS, such as a Vblock™ System from VCE Company, LLC, can comprise multiple converged infrastructure elements (CIEs) in a preconfigured or prepackaged computing platform. For example, a CIS can comprise a single computing platform unit associated with racks of physical CIEs and related software for performing virtualization and/or other information technology (IT) functions. In some embodiments, each CIE associated with a CIS can comprise a compute component, a software component, a networking component, a hardware component, or a firmware component. For example, a CIS can comprise data storage devices, servers, networking equipment, and software for managing physical resources and/or virtualized resources (e.g., virtual servers).

In accordance with some embodiments of the subject matter disclosed herein, a CMIM module can be integrated into a CIS to manage credential information sets that are necessary to perform a workflow. As used herein, a credential information set can include authorization and/or authentication information (e.g., access passwords, access cookies, access tokens, cryptographic keys, etc.) pertaining to CIEs or resources utilized by a CIS. The CMIM can be configured to request a list of CIEs that will be involved with the workflow. In some embodiments, the CMIM can comprise a component organization module (COM) designed to organize the list of CIEs according to the interdependencies of the CIEs within the CIS. As used herein, "CIS component" or "CIS component device" or "CIE" are synonymous terms that refer to a component or element included within a CIS. The CMIM may subsequently query the repository again for credential information associated with the CIEs, and then correlate (e.g., match the credentials with the CIEs). A visual representation of the credentials and CIEs can also be generated to provide convenient access and management of credential information used to perform the workflow. As used herein, the term "workflow" may refer to a work assignment or project that is associated with a process comprising numerous actions or steps. In addition, a workflow may involve or utilize multiple CIEs in a CIS.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
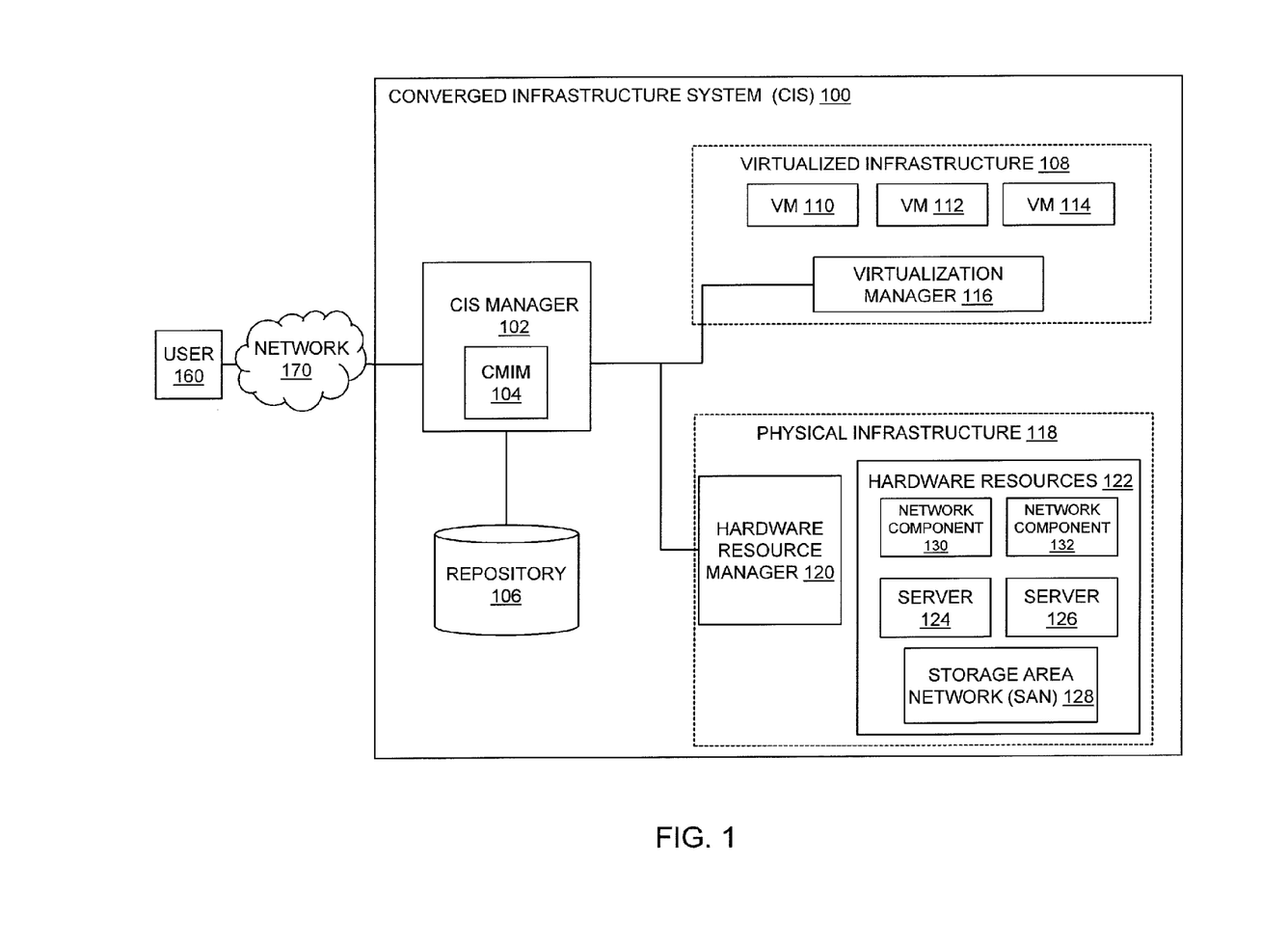
FIG. 1 illustrates an exemplary converged infrastructure system in accordance with embodiments of the subject matter described herein.

FIG. 1 is a diagram illustrating exemplary CIS 100 according to an embodiment of the subject matter described herein. In some embodiments, CIS 100 can comprise one or more physical resources and one or more virtual resources. Exemplary physical resources can comprise a processor, a server, network equipment, a router, a switch, wiring or cabling, a storage device, a physical port, and/or a communications interface. Exemplary virtual resources can comprise a virtual entity (e.g., an entity that appears as a physical entity but comprises one or more CIEs associated with one or more CISs), a virtual machine, a virtual server, a virtual storage device, a virtual port, and/or a virtual communications interface. CIS 100 may also comprise software and related CIEs for managing the CIS and/or portions therein.

In some embodiments, CIS 100 can be configured to provide data center functionality, cloud service functionality, and/or other IT functionality which can support a vast number of software workloads. CIS 100 can also be configured to communicate with various other entities, such as other CISs, network nodes, and users. For example, user 160 (e.g., a human operator or an automated system) may use an application programming interface (API), a command line interface, or web-based graphical user interface to login to CIS 100 to request a credential information set (e.g., one or more passwords or credentials) for a particular CIE.

In some embodiments, CIS 100 can comprise a CIS manager 102 (e.g., a CIS management module), a repository 106, virtualized infrastructure 108, and/or physical infrastructure 118. CIS manager 102 may be any suitable entity for managing the operation of CIS 100. CIS manager 102 may be configured to communicate with various CIEs, such as virtual resources, physical resources, and/or software for managing various CIEs. For example, CIS manager 102 may be configured to manage performance, resource utilization levels, and other aspects associated with virtualized infrastructure 108 and/or physical infrastructure 118. In some embodiments, CIS manager 102 comprises VCE Vision™ Intelligent Operations software and/or firmware. In some embodiments, CIS manager 102 may be provisioned with a credential management module (CMIM) 104.

Virtualized infrastructure 108 can comprise a virtualization environment configured to simulate components of a computing device, e.g., a processor, system memory, and a storage device, for executing one or more virtual machines (VMs). For example, each of VM 110, VM 112, and VM 114 may be configured to perform various functions and/or services, such as web server functions or cloud application services, and may interact with various nodes, components, and/or users.

In some embodiments, virtualized infrastructure 108 may be associated with one or more virtual entities. Each virtual entity can comprise one or more CIS or portions therein. In some embodiments, virtualization manager 116 may allow logical entities to be created, deleted, or modified using an API, a graphical user interface (GUI) or a command line interface (CLI). Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as network components 130-132, compute servers 124-126 (sometimes referred to as "hosts"), and one or more storage area networks (SAN), such as SAN 128. In some embodiments, one or more file share storage (FSS) systems (not shown) can be utilized to provide file system level access to a CIS across a local area network (LAN). Hardware resources 122 may be communicatively connected to various other components in CIS 100 and other entities. Hardware resources 122 can be configured to be used by one or more virtual entities. In some embodiments, network components 123-124 (e.g., network switches) may be configured to enable communication between the resources within the CIS. For example, server 124 and SAN 128 may be used in implementing VM 110 and VM 112 and server 126 and SAN 128 may be used in implementing VM 114 and virtualization manager 116.

Hardware resource manager 120 may be any suitable entity (e.g., software executing in a virtual machine) for managing aspects associated with physical infrastructure 118. In some embodiments, hardware resource manager 120 may be configured to provision hardware resources 122 via one or more communications interfaces. For example, hardware resource manager 120 may provision hardware resources 122 for implementing one or more virtual entities in virtualized infrastructure 108.

Repository 106 may comprise any data storage unit (e.g., a database or plurality of databases) that may be configured to function as a centralized administrative password and credential storage unit for the CIEs of CIS 100. Although FIG. 1 depicts repository 106 as a local data storage unit residing on CIS 100, repository 106 can also be embodied as a data storage unit located at a public distributed content site, on a local proxy server in a customer's environment, or on a different CIS without departing from the scope of the disclosed subject matter.

Figure 2:
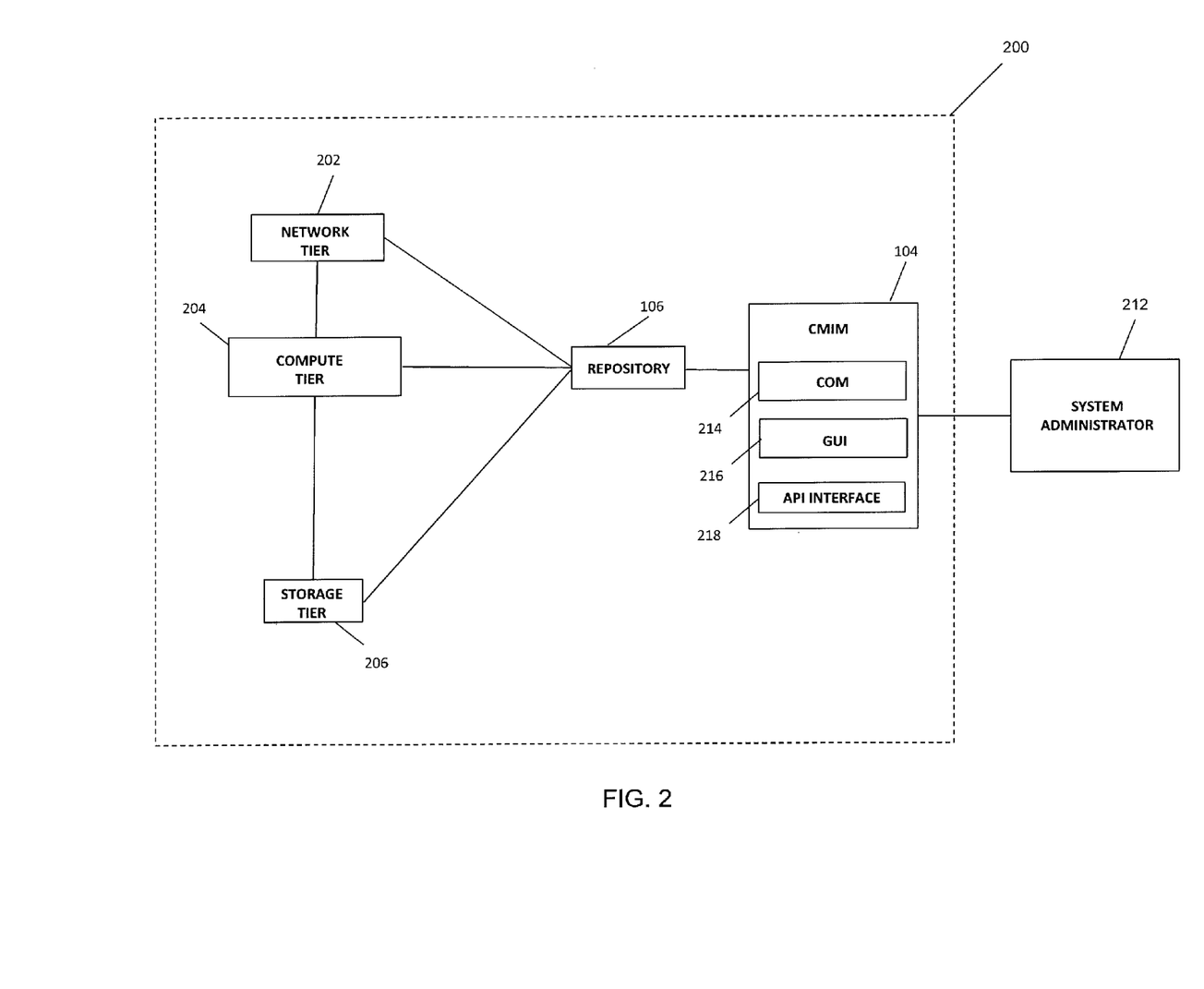
FIG. 2 illustrates an exemplary logical representation of component tiers managed within a converged infrastructure system in accordance with embodiments of the subject matter described herein.

In some embodiments, CMIM 104 can be configured to manage a system comprising multiple sub-system tiers. FIG. 2 illustrates an exemplary configuration of a credential management interface module managing a three tiered system, generally designated 200, in accordance with embodiments of the subject matter depicted herein. It should be noted that the exemplary configuration presented in FIG. 2 can be conveniently applied to larger systems that comprises N tiers of sub-systems.

In some embodiments, CMIM 104 can be configured to operate as a standalone virtual machine or function as a module embedded in a software entity (e.g., as shown in FIG. 1). Furthermore, CMIM 104 can be configured to manage credential information sets associated with the converged infrastructure elements in the CIS 200 using a plurality of interfaces. In some embodiments, CIEs can include the components of the physical infrastructure 118 and the components of virtualized infrastructure 108 shown in FIG. 1.

In some embodiments, a user interface (UI) included within CMIM 104 can be used by a system administrator to replace and/or renew credential information sets, such as access credentials. In some embodiments, a user interface may include a graphical user interface (GUI) and/or a command line interface (CLI). For example, a GUI can comprise user interface (UI) elements, such as pull down menus or push buttons, configured to give a system administrator the option to change the access credentials associated with the CIEs and resources of CIS 200. Exemplary methods in which the UI and CMIM 104 are utilized by a system administrator are discussed in further detail below.

It will be appreciated that FIG. 1 is for illustrative purposes and that various nodes, their locations, and/or their functions as described above in relation to FIG. 1 may be changed, altered, added, or removed.

FIG. 2 illustrates an exemplary logical representation of component tiers managed within a converged infrastructure system in accordance with embodiments of the subject matter described herein. As illustrated in FIG. 2, a CIS 200 can comprise a network component tier 202, a compute component tier 204, and a storage component tier 206, where each tier can include one or more CIEs. CIS 200 may further include a CMIM 104 that is includes a components organization module (COM) 214, GUI 216, an API interface 218 and a command line interface (CLI) (not shown). At least one of GUI 216, API interface 218, and the CLI may be used by a system administrator 212 to access CMIM 104. For example, API interface 218 can comprise a user interface element that system administrator 212 may use to request credential information for CIEs associated with a particular workflow (as designated by the system administrator). In some embodiments, a workflow may include a deployment workflow, a remedial workflow, an optimization workflow, and/or a provisioning or provisional workflow. A remedial workflow can include a set of steps designed to provide remedy for an incorrect, faulty, or misconfigured CIE. For example, an administrator can create a remedial workflow to change a configuration setting of a network device in a networking CIS to correct an existing network error. An optimization workflow can comprise a set of steps designed to move resources between CIEs to optimize the performance of an application, to minimize energy consumption, or some other optimization goal. A provisional or provisioning workflow can include a set of steps designed to create a new object or a set of objects in a CIS. For example, an administrator can create a provisional or provisioning workflow to reserve a set of resources within a CIS for creating a new virtual machine, which can be accomplished manually by a user or automatically by a program (e.g., a program based on algorithmic processing of metric data stored in a CIS manager). Each component tiers 202-206 and CMIM 104 may also be configured to be communicatively connected to repository 106. In some embodiments, repository 106 can include one or more databases that can be configured to store data related to the components included in component tiers 202-206. For example, component information and credential information sets associated with each of the components may be stored in one or more databases (e.g., in a single database or distributed across multiple databases) in repository 106.

In some embodiments, network component tier 202 can include network switches configured to handle network traffic for closed networks and designed to transport data packets internally within the network. Compute component tier 204 may comprise computer software, firmware or hardware components. In some embodiments, the compute tier may also be designed to create and run software based, virtual machines via a hypervisor. As used herein, the terms "hypervisor" or "hypervisor element" can refer to computer software, firmware and/or hardware that is responsible for creating and running virtual machines. In some embodiments, a hypervisor can be configured to function as a host operating system configured to host guest operating systems, where the guest operating system can function within the hypervisor as a virtual machine and provide a running platform to software applications. Furthermore, storage component tier 206 can be a data storage system configured to provide storage services to multiple clients, including a hypervisor and a virtual machine. In some embodiments, COM 214 can be used to visually link the systems and CIEs associated with component tiers 202-206 together as said systems and CIEs are arranged within CIS 200. CMIM 104 can subsequently correlate the systems and CIEs with credential information retrieved from repository 106. Administrator 212 can be used to access the linked credential information via GUI 216 or a CLI.

In some embodiments, CMIM 104 can be configured to query repository 106 for component information that identifies one or more CIEs (e.g., hardware and/or software components in component tiers 202-206) that are involved or associated with a particular workflow. In some embodiments, CMIM 104 may use COM 214 to visually display the system CIEs via GUI 216 (e.g., see FIG. 3 for an exemplary GUI display). For example, COM 214 may generate a display of the system CIEs included in component tiers 202-206 that are used by a particular workflow. In some embodiments, a system administrator may also utilize the GUI 216 to instruct CMIM 104 to submit a credential request to repository 106 in order to retrieve one or more credential information sets for the respective one or more CIEs (e.g., components in component tiers 202-206 that are associated with the workflow). In some embodiments, the credential information set can include any type of authorization and/or authentication information, such as authorization and authentication information pertaining to network switch configurations, virtualization layer credentials, and the like.

In some embodiments, CMIM 104 may be configured to generate a visual representation that links CIEs with respective credential information (e.g., see description of FIG. 4 below). In some embodiments, API interface 218 can comprise a user interface element that system administrator may use to request credential information associated with a particular workflow. In some embodiments, CMIM 104 may also utilize API interface 218 (e.g., a RESTful API) to access credential information stored in repository 106. Once a particular workflow configuration has been selected and the credential information sets associated with the designated workflow have been obtained and matched with the appropriate CIEs, COM 214 can generate a visual representation (e.g., a CIE topology map illustrated in FIG. 4) that arranges the CIEs involved with the workflow and associates the CIEs to corresponding credential information. For example, the CIEs (and the associated credential information) can be linked together (e.g., a credential chain) as configured in the workflow. In addition, based on the sensitivity of the credential information involved with performing the workflow, industry standard security measures, such as high-grade encryption of the data can be utilized to provide protection to the credential information. Furthermore, a proper Role-Based Access Control (RBAC) system can be used to ensure that only authorized users and/or roles have access to the credential information.

Figure 3:
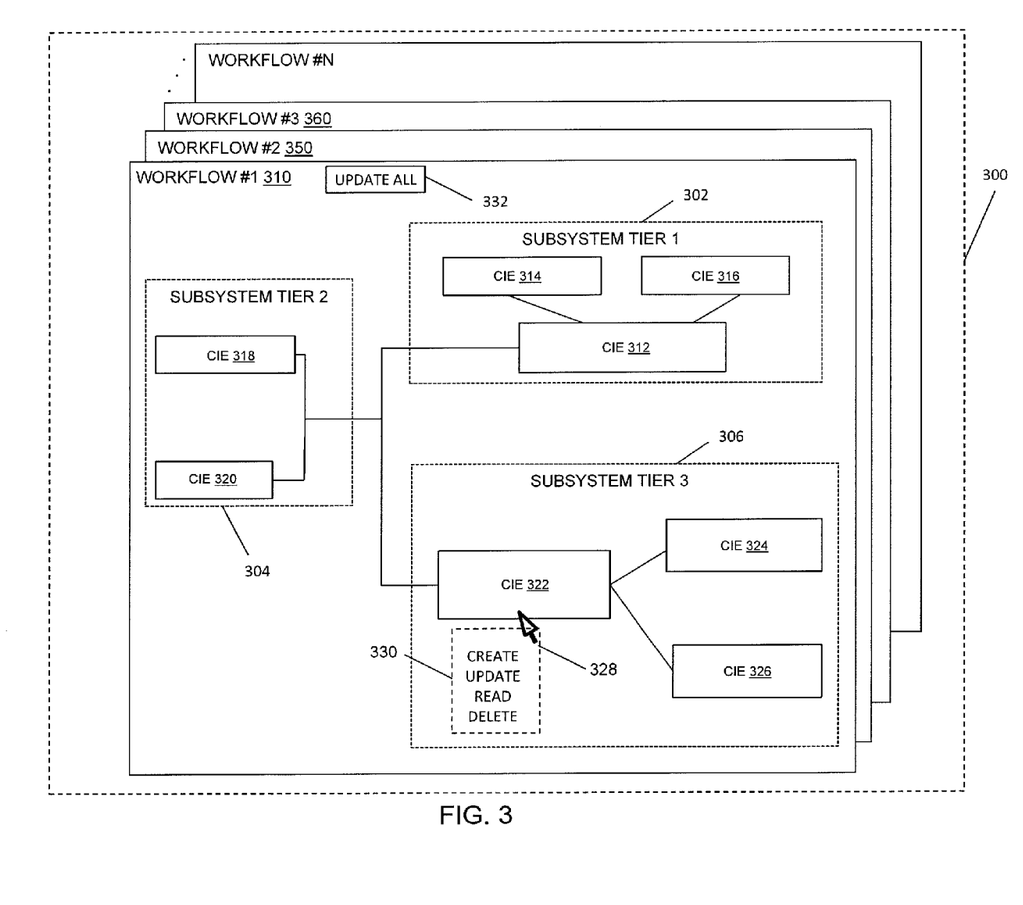
FIG. 3 illustrates a graphical user interface of a workflow comprising of three tiers of subsystems configured to enable a converged infrastructure system to function as a cloud service platform in accordance with embodiments of the subject matter described herein.

FIG. 3 illustrates an exemplary GUI, generally designated 300, of a workflow comprising three tiers of subsystems configured to enable a CIS to function as a cloud service platform in accordance with embodiments of the subject matter described herein. As illustrated in FIG. 3, the CIEs of subsystem tier 1 302, subsystem tier 2 304, and subsystem tier 3 306 associated with workflow #1 310 can be utilized to enable the CIS to function as a cloud service platform in some embodiments. For example, workflow #1 310 can configure the CIS to provide a virtual infrastructure for the execution of a sizable quantity of software workloads. In some embodiments, GUI 300 can comprise multiple display views designed to present multiple workflows. For example, workflow #1 310 can be displayed in a front display view that is positioned in front of display views workflow #2 350 and workflow #3 360, which may be configured for selection by a system administrator. As illustrated in FIG. 3, workflow #1 310 can include three subsystem tiers 302-306, wherein each tier can include one or more CIEs. For example, subsystem tier 302 may include CIEs 312-316, subsystem tier 304 may include CIEs 318-320, and subsystem tier 306 may include CIEs 322-326. In some embodiments, the CIEs illustrated in FIG. 3 can comprise one or more virtual machines, servers, load balancers, switches, storage devices, software applications (e.g., multiple virtualized software applications), blade appliances, and other components well known to those of skill in the art. Notably, the CIEs depicted in workflow #1 310 of FIG. 3 are intended to serve as one exemplary embodiment of the subject matter disclosed herein, and not as a limitation. Furthermore, although GUI 300 depicts three subsystem tiers, any number of tiers (and any number of CIEs within said tiers) may be utilized without departing from the scope of the disclosed subject matter.

In some embodiments, a workflow can be created through a set of methods and/or functions provided via one or more APIs. Data (e.g., CIE information) associated with the workflow can be acquired from various sources (e.g., a software system data model or a CIS management tool) via a GUI or entered manually through a command line interface. Likewise, creation of the workflow can be performed in a repository associated with the CIS through either the GUI or the CLI. For example, a user (e.g., a workflow creator) may generate a workflow by initially obtaining (e.g., pulling) the data needed for the creation of a components list from a software data model or a CIS manager tool. Exemplary data used to generate a workflow can include metric data or other data stored in a CIS manager. Afterwards, the user may use the acquired data to generate the components list utilizing an API interface (e.g., a RESTful web service interface). The steps of a workflow can be determined by the user (e.g., a CIS administrator using the GUI or CLI) or be generated automatically by a program comprising one or more metric data processing algorithms. In some embodiments, one or more CIEs (e.g., CIEs 312-326) associated with workflow #1 310 may be identified by CMIM 104 by querying a repository (e.g., repository 106). Credential information associated with each identified CIE (e.g., CIEs 312-326) may also be obtained by CMIM 104 from repository 106. In some embodiments, modules (e.g., CMIM 104, CIS manager 102, and the like) associated with CIS 100 can execute or perform workflow #1 310 to enable CIS 100 to function as a cloud service platform. Furthermore, a visual representation can be generated by CMIM 104 to present CIEs 312-326 and credential information associated with CIEs 312-326 to be viewed by a system administrator. The visual representation may visually link the CIEs to their respective credential information sets and may display the CIEs in a manner similar to which the CIEs are arranged and/or positioned within the CIS. In some embodiments, smaller workflows may be combined in the repository to form a larger workflow through a user interface (e.g., GUI or CLI). In some embodiments, credential information sets associated with a workflow can be stored separately (e.g., in a local or remote software instance or in a separate repository associated with CMIM 104) from the workflow to keep the credential information sets secure.

In some embodiments, credential information related to each of the CIEs depicted in workflow #1 310 can be retrieved from a repository by a CMIM accessed by a system administrator. For example, by using a UI indicator 328 (e.g., a computer mouse pointer) to select the graphical representation of CIE 322, a system administrator can bring up a selection window 330 for creating, reading, updating, and/or deleting credential information associated with CIE 322. In some embodiments, the system administrator can use GUI 300 to create new credential information, such as assigning a new username and password pair to CIE 322 by selecting a "create" option on selection window 330. Similarly, the system administrator can remove a username and password pair from the existing credential information by selecting a "delete" option on selection window 330. Moreover, selecting a "read" option can provide the system administrator with an overview of the credential information associated with CIE 322. The system administrator can also utilize selection window 330 in GUI 300 to update credential information associated with CIE 322 via the "update" option. Although the use of selection window 330 is shown in FIG. 3, it is understood that other interactive UI elements may be utilized without departing from the scope of the disclosed subject matter. In some embodiments, the system administrator may utilize GUI 300 to update the credential information associated with all of the CIEs included in workflow 310 by utilizing an "update all" 332 UI element. Such a feature enables the system administrator to update or reset the access credentials with a single action. It should be noted that GUI 300 can be configured to allow administrative access to a single administrator (or other authorized operators or users) at any one time. Such a feature can be used to prevent any potentially conflicting modifications made to the system by system administrators who have contemporaneous access.

Figure 4:
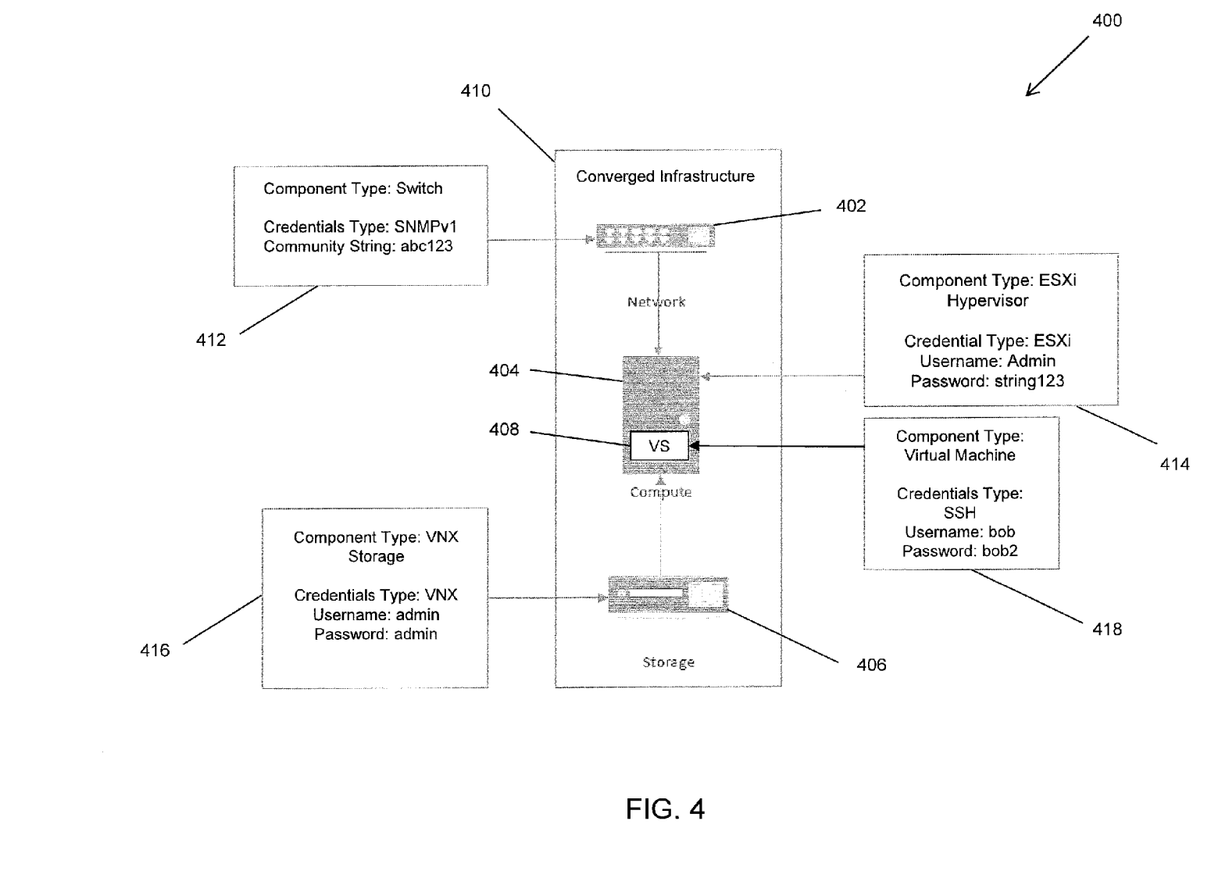
FIG. 4 illustrates an exemplary visual representation of correlated component tier information and credential information associated with a converged infrastructure system configured in accordance with embodiments of the subject matter described herein.

FIG. 4 illustrates an exemplary visual representation 400 of a CIS 410 configured to manage credential information associated with a multi-component tier system in accordance with embodiments of the subject matter described herein. As used herein in FIG. 4, a component tier can comprise one or more CIEs in a preconfigured or prepackaged computing platform. In some embodiments, a component tier topology map (e.g., a display in Visio format) can be generated to provide a visual display of the credential sets needed to perform a workflow. As illustrated in FIG. 4, CIS 410 can include a network component tier 402, a compute component tier 404, a virtualization software (VS) component tier 408, and a storage component tier 406. Notably, component tiers 402-408 can be arranged and linked in visual representation 400 according to the component tiers' respective positioning within CIS 410. In some embodiments, network component tier 402 can be communicatively connected to compute component tier 404 and comprise one or more network components (e.g. switches). In some embodiments, credential information needed to access network component tier 402 may be positioned (e.g., displayed) on visual representation 400 in close proximity to (i.e., next to) the representation of component tier 404. For example, a display element 412 including a SNMPv1 type credential that is required to access the network switches may be positioned next to component tier 402.

Similar display elements 414-416 may be utilized with compute component tier 404 and storage component tier 406, respectively.

In some embodiments, compute component tier 404 can include a hypervisor (e.g., an ESXi hypervisor manufactured by VMware, Incorporated of Palo Alto, Calif.) that may be configured to function as a host operating system and/or a virtual machine that runs as one or more guest application (e.g., operating system) within the hypervisor. Similarly, credential information that may be utilized to access the hypervisor can be displayed next to the components via display elements 414. For example, the hypervisor may require an ESXi type credential that includes a username and associated password for access as shown in display element 414. In some embodiments, compute component tier 404 can be communicatively connected to storage component tier 406, which may require a VNX type credential for access as shown in display element 416. In addition, compute component tier 404 can also be communicatively connected to virtualization software component tier 408. Virtualization software component tier 408 can be configured to host virtual entities including a virtual machine, a virtual server, a virtual storage device, a virtual port, and/or a virtual communications interface, and can require a virtualization software specific credential as shown in display element 418.

Figure 5:
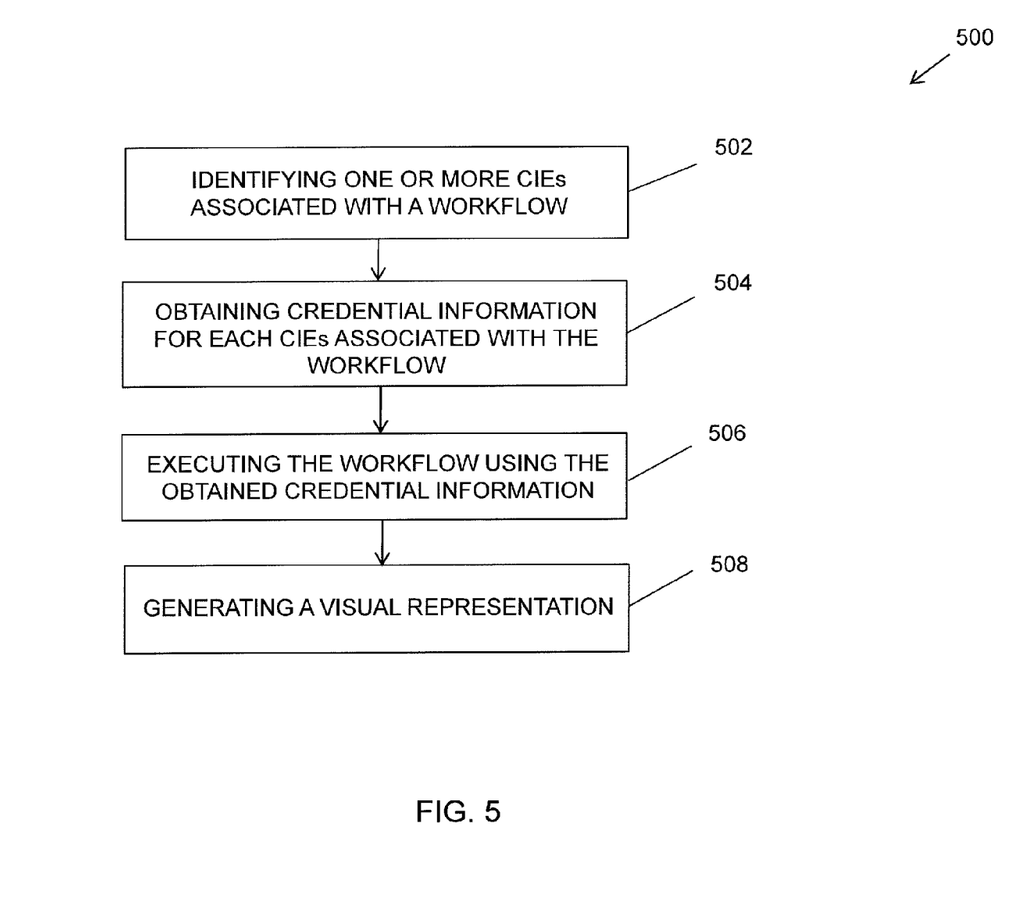
FIG. 5 illustrates a flow chart of an exemplary process for managing credential information in accordance with embodiments of the subject matter described herein.

FIG. 5 illustrates a flow chart of an exemplary process 500 for managing credential information in accordance with embodiments of the subject matter described herein. At step 502, the CMIM is configured to identify one or more CIEs associated with a workflow. For a particular workflow, the CMIM may be configured to generate and send a query message to a local repository to obtain the information that identifies the CIEs (e.g., hardware and/or software components) that are involved with the execution of the workflow selected by a system administrator. For example, referring to FIG. 3, CMIM 104 may identify one or more CIEs (e.g., CIEs 312-326) associated with workflow 310 by performing a query to repository 106 (as shown in FIGS. 1 and 2, for example). As noted above, the repository may be configured to maintain and store relationships between each workflow (e.g., workflows #1-#N) and its related CIEs. Such a workflow 310 may enable CIS 100 to use specific CIEs (e.g., CIEs 312-326) to operate as a cloud service platform.

At step 504, the CMIM obtains credential information for each CIEs associated with the workflow. For example, the CMIM may query the repository and utilize the obtained CIE information to request associated credential information that is needed to interact with each of the identified CIEs. Continuing with the example in step 502, CMIM 104 may be configured to obtain the credential information for each identified CIE (e.g., CIEs 312-326) associated with workflow 310 from repository 106 (as shown in FIGS. 1 and 2, for example). As noted above, the credential information for each CIE (e.g., CIEs 312-326) might be stored in one or more repositories accessible by CMIM 104. Furthermore, it is understood that after CIE information and associated credential information sets have been obtained, CMIM 104 may also be configured to correlate or match each credential information sets with a respective CIE in preparation for executing a workflow, generating a visual representation of CIEs within the CIS, and/or for providing other functions (e.g., via APIs) to access, use and maintain multiple CIEs of a CIS.

At step 506, CMIM 104 is configured to execute the workflow using the obtained credential information. In this way, a CIS might be configured to perform specific tasks and/or to provide various services automatically without time consuming, manual, and/or potentially error-prone human interactions. Continuing the example in step 504, in some embodiments, modules (e.g., CMIM 104, CIS manager 102, and the like) associated with CIS 100 are configured to execute workflow 310 which enables CIS 100 to function as a cloud service platform. More specifically, automatic use of the obtained credential information for each CIE (e.g., CIEs 312-326) of workflow #1 310 enables CIS modules such as CMIM 104 and/or CIS manager 102 to automatically access, manage, configure, provision, and/or deploy the various CIEs 312-326 (including software applications) to provide cloud services for one or more remote users 160 via network 170 (as shown in FIG. 1, for example).

At step 508, the CMIM is configured to generate a visual representation of the CIEs involved in the workflow along with each CIE's credential information. For example, CMIM 104 may generate a visual representation 400 (as shown in FIG. 4) of CIEs 312-326 and credential information for each of the CIEs 312-326 to be viewed by a system administrator as discussed above. Such a visual representation may also include other information or metadata regarding each CIE, each workflow, and/or other related information pertinent to configuring and executing a workflow in such an environment, which is well known to those in the art. In some embodiments, the visual representation may depict the CIEs in a manner in which the CIEs are arranged and/or positioned within the CIS. Similarly, credential information sets may be visually linked to correlated CIEs, thereby creating a CIE topology map (or some other visual display) that provides a chain of access credentials required to perform the workflow selected by a system administrator.

Figure 6:
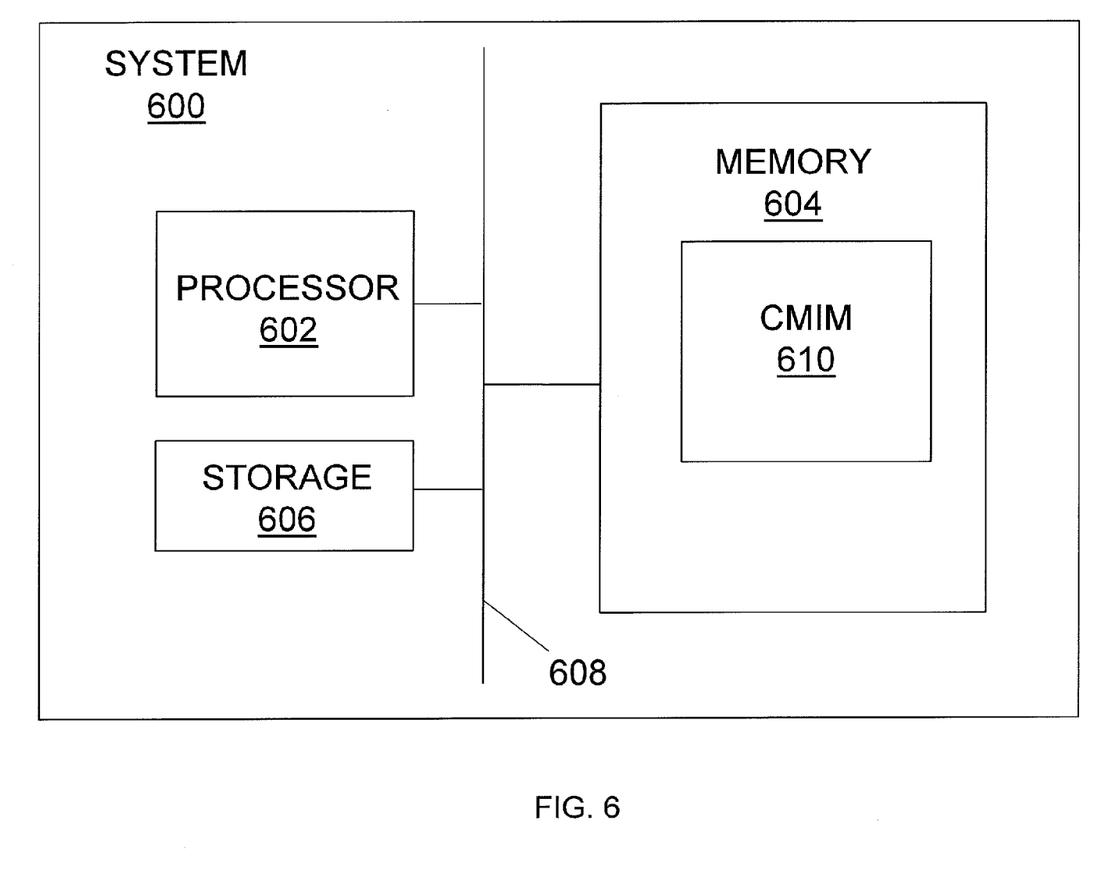
FIG. 6 illustrates a block diagram of a general purpose computer system suitable for use in performing the functions described herein.

FIG. 6 depicts a high level block diagram of a general purpose computer system suitable for use in performing the functions described herein. As depicted in FIG. 6, system 600 comprises a processor 602, a memory 604, a storage device 606, and communicatively connected via a system bus 608. In some embodiments, processor 602 can comprise can comprise a microprocessor, central processing unit (CPU), or any other like hardware based processing unit. In some embodiments, a CMIM 610 can be stored in memory 604, which can comprise random access memory (RAM), read only memory (ROM), optical read/write memory, cache memory, magnetic read/write memory, flash memory, or any other non-transitory computer readable medium. In some embodiments, processor 602 and memory 604 can be used to execute and manage the operation of CMIM 610. In some embodiments, storage device 606 can comprise any storage medium or storage unit that is configured to store data accessible by processor 602 via system bus 608. Exemplary storage devices can comprise one or more local databases hosted by system 600.

As indicated above, the subject matter described herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used herein, the terms "function" or "module" refer to hardware, firmware, or software in combination with hardware and/or firmware for implementing features described herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for performing workflow credential information management in a converged infrastructure system (CIS), the method comprising:
   at a credential management interface module (CMIM) associated with a CIS:
   identifying one or more converged infrastructure elements (CIEs) included in the CIS that are involved with an execution of a workflow;
   obtaining credential information sets for each of the one or more CIEs identified to execute the workflow;
   generating a topology map that displays a correlation between the one or more CIEs and the obtained credential information sets; and
   executing the workflow by using the obtained credential information sets to manage the one or more CIEs to provide services associated with the workflow.

2. The method of claim 1 further comprising correlating the obtained credential information sets to the one or more CIEs.

3. The method of claim 1 wherein the topology map includes a CIE topology map that depicts the positioning of the one or more CIEs in the CIS.

4. The method of claim 3 wherein the CIE topology map displays each of the one or more CIEs with the correlated credential information sets.

5. The method of claim 1 further comprising presenting the topology map on an interactive graphical user interface (GUI) configured for managing the credential information sets.

6. The method of claim 5 wherein managing the credential information sets comprises performing at least one or more of:
   creating one or more new credential information sets;
   deleting one or more of the credential information sets;
   updating one or more of the credential information sets; and
   reading one or more of the credential information sets.

7. The method of claim 1 wherein obtaining credential information sets comprises querying a repository for the credential information sets using an application programming interface (API).

8. A system for performing workflow credential information management in a converged infrastructure system (CIS), the system comprising:
   at least one processor;
   a memory; and
   wherein the memory stores a credential management interface module (CMIM) that when executed by the at least one processor is configured to identify one or more converged infrastructure elements (CIEs) involved with an execution of a workflow, obtain credential information sets for each of the one or more CIEs identified to execute the workflow, generate a topology map that displays a correlation between the one or more CIEs and the obtained credential information sets, and execute the workflow by using the obtained credential information sets to manage the one or more CIEs to provide services associated with the workflow.

9. The system of claim 8 wherein the CMIM is further configured to correlate the obtained credential information sets to the one or more CIEs.

10. The system of claim 8 wherein the topology map includes a CIE topology map that depicts the positioning of the one or more CIEs in the CIS.

11. The system of claim 10 wherein the CIE topology map displays each of the one or more CIEs with the correlated credential information sets.

12. The system of claim 8 wherein the CMIM is further configured to present the topology map on an interactive graphical user interface (GUI) configured for managing the credential information sets.

13. The system of claim 12 wherein managing the credential information sets comprises performing at least one or more of:
   creating one or more new credential information sets;
   deleting one or more of the credential information sets;
   updating one or more of the credential information sets; and
   reading one or more of the credential information sets.

14. The system of claim 8 wherein the CMIM is further configured to use information associated with the identified one or more CIEs to query a repository for the credential information sets.

15. A non-transitory computer readable medium having stored thereon executable instructions that when executed by a processor of a computer control the computer to perform steps comprising:
   at a credential management interface module (CMIM) associated with a CIS:
   identifying one or more converged infrastructure elements (CIEs) included in the CIS that are involved with an execution of a workflow;
   obtaining credential information sets for each of the one or more CIEs identified to execute the workflow;
   generating a topology map that displays a correlation between the one or more CIEs and the obtained credential information sets; and
   executing the workflow by using the obtained credential information sets to manage the one or more CIEs to provide services associated with the workflow.

16. The non-transitory computer readable medium of claim 15 further comprising correlating the obtained credential information sets to the one or more CIEs.

17. The non-transitory computer readable medium of claim 15 wherein the topology map includes a CIE topology map that depicts the positioning of the one or more CIEs in the CIS.

18. The non-transitory computer readable medium of claim 17 wherein the CIE topology map displays each of the one or more CIEs with the correlated credential information sets.

19. The non-transitory computer readable medium of claim 15 further comprising presenting the topology map on an interactive graphical user interface (GUI) configured for managing the credential information sets.

20. The non-transitory computer readable medium of claim 19 wherein managing the credential information sets comprises performing at least one or more of:
   creating one or more new credential information sets;
   deleting one or more of the credential information sets;
   updating one or more of the credential information sets; and
   reading one or more of the credential information sets.

* * * * *